United States Patent [19]

Swarup et al.

[11] Patent Number: 5,723,555
[45] Date of Patent: Mar. 3, 1998

[54] VINYL RESINS CONTAINING ALKOXYACRYLAMIDE-POLYOL REACTION PRODUCTS AND USE IN EPOXY RESIN BLENDS FOR COATINGS

[75] Inventors: Shanti Swarup; Ronald R. Ambrose, both of Hampton Township, Allegheny County; James B. O'Dwyer, Clinton Township, Butler County; Lawrence J. Fitzgerald, Richland Township, Allegheny County, all of Pa.

[73] Assignee: PPG Industries, Inc., Pittsburgh, Pa.

[21] Appl. No.: 672,153

[22] Filed: Jun. 27, 1996

Related U.S. Application Data

[63] Continuation of Ser. No. 557,504, Nov. 14, 1995, abandoned, which is a continuation of Ser. No. 219,332, Mar. 29, 1994, abandoned.

[51] Int. Cl.$^6$ .............................. C08F 222/00; C08F 2/06
[52] U.S. Cl. .................. 526/210; 526/310; 526/318.4; 526/318.45; 524/555; 524/556; 524/765
[58] Field of Search .................. 526/310, 318.4, 526/318.45, 318.6, 329.1, 329.2, 210; 524/535, 536, 555, 556, 560, 765

[56] References Cited

U.S. PATENT DOCUMENTS

| | | | |
|---|---|---|---|
| 3,862,075 | 1/1975 | Sekmakas | 526/318.45 |
| 3,928,273 | 12/1975 | Chang et al. | 526/318.6 |
| 3,980,602 | 9/1976 | Jakubauskas | 526/318.45 |
| 4,289,674 | 9/1981 | Christenson et al. | 523/100 |
| 4,309,327 | 1/1982 | Ishikura et al. | 524/555 |
| 4,335,829 | 6/1982 | Christenson et al. | 524/767 |
| 4,414,370 | 11/1983 | Hamielec et al. | 526/318.6 |
| 4,440,897 | 4/1984 | Maska | 524/535 |
| 5,096,954 | 3/1992 | Yamada et al. | 524/511 |
| 5,138,004 | 8/1992 | dePierne et al. | 526/318.6 |
| 5,326,843 | 7/1994 | Lorah et al. | 526/318.6 |
| 5,473,032 | 12/1995 | Bederke et al. | 524/555 |

*Primary Examiner*—Tae Yoon
*Attorney, Agent, or Firm*—Dennis G. Millman; Paul S. Chirgott

[57] ABSTRACT

Improved application latitude, including blister resistance, has been found attainable using a coating formulation that includes a water dispersible resin comprising the addition copolymerization reaction product of vinyl monomers including an acid group containing monomer, an N-(alkoxymethyl)acrylamide or N-(alkoxymethyl)methacrylamide monomer, and at least one other vinyl monomer, the reaction being carried out in the presence of a solvent including a polyol, wherein the OH groups of polyol molecule are of unequal reactivity. The copolymer may be blended with an amine modified epoxy resin to form a coating composition particularly suitable for application onto metal surfaces such as can stock.

16 Claims, No Drawings

VINYL RESINS CONTAINING ALKOXYACRYLAMIDE-POLYOL REACTION PRODUCTS AND USE IN EPOXY RESIN BLENDS FOR COATINGS

This is a continuation of application Ser. No. 08/557,504, filed Nov. 14, 1995 now abandoned, which is a file wrapper continuation of U.S. application Ser. No. 08/219,332 filed Mar. 29, 1994, now abandoned.

BACKGROUND OF THE INVENTION

The present invention relates to vinyl (acrylic) resins and the use thereof in resinous blends with modified epoxy resins. The utility of the present invention relates to water-based coating compositions of resinous blends which have been found to be very suitable for can or coil coatings.

In the area of can coatings in particular, coatings intended for use in food and beverage industries generally are expected to meet a number of requirements in order to be commercially acceptable. The coating should adhere well to the base metal and should possess flexibility, extensibility and adhesion characteristics so as to withstand the processing of the container itself. The coating sometimes also must be able to resist heat which can be encountered during processing of the container and its contents. Additionally, the coating itself should not affect the taste of a food or beverage which is put into the coated container. Film continuity is another characteristic sought after, and one aspect of this requirement is that coatings be blister-free. Blistering is a defect that arises from gas by-products of curing the coating becoming trapped in the coating, and is a problem particularly associated with coated areas in which the coating is relatively thick. A coating that is prone to blistering requires special precautions to be taken during coating to assure that a maximum allowable coating thickness is not exceeded on any portion of the article being coated. It would be desirable if greater latitude could be permitted as to allowable coating thicknesses without inducing blistering. Blister resistance also relates to coating line speed, such as on a production line roll for coating continuous strips of metal. It has been found that blistering can be induced by high line speeds with coatings that have relatively low blister-free thicknesses, regardless of the thickness of the coating actually applied. Therefore, it would be desirable for coatings to have higher blister-free thicknesses for the sake of higher line speeds.

U.S. Pat. No. 4,605,476 (Hart et al.) discloses waterborne can coatings that comprise blends of epoxy resins that have been defunctionalized with ammonia or amine and acrylic copolymers that may incorporate N-(alkoxymethyl)acrylamide or methacrylamide. Mono-alcohols are disclosed as copolymerization solvents for the acrylic component. Although these coatings provide acceptable performance at relatively low line speed, susceptibility to blistering increases with increasing line speeds. It would be desirable to provide greater latitude in coating application conditions, including faster line speeds, particularly improved blister resistance.

U.S. Pat. No. 4,174,333 (Hartman et al.) discloses waterborne can coatings containing epoxy resins that have been defunctionalized with ammonia or amine and have been reacted with an anhydride. These coatings would benefit from the same improvements mentioned with regard to the patent discussed above.

SUMMARY OF THE INVENTION

It has now been discovered that certain vinyl addition copolymers provide improved latitude regarding blister resistance when blended with defunctionalized epoxy resins in waterborne coatings. The novel vinyl addition copolymers are produced from an acid group-containing monomer, an N-(alkoxymethyl)acrylamide or N-(alkoxymethyl)methacrylamide monomer, and at least one other vinyl monomer, the copolymerization being carried out in the presence of a solvent including a polyol, wherein the polyol molecule includes OH groups of different reactivity. It has been found that an increase in coating thickness latitude results when the copolymerization is carried out in the presence of an alcohol solvent reactive with the acrylamide groups of the vinyl addition copolymer. Polyols have been found to be substantially more reactive in this regard than mono-alcohols. However, many polyols when used for this purpose have been found to yield unacceptable molecular weight increase, in some cases resulting in gelation which renders the resin useless for the intended purpose. To avoid gelation, the polyols useful in the present invention are those which are characterized by OH groups having different reactivity with regard to the acrylamide groups. In other words, the polyols of the present invention include combinations of a primary OH group, a secondary OH group, or a tertiary OH group, but avoid having two or more primary OH groups, two or more secondary OH groups, or two or more tertiary groups.

The present invention additionally encompasses a coating composition comprising as an essential film-former a resinous blend of:

(i) from about 5 to 95 percent by weight of an ammonia or amine defunctionalized epoxy; and (ii) from about 5 to 95 percent by weight of a vinyl addition copolymer produced from an acid group-containing monomer, an N-(alkoxymethyl)acrylamide or N-(alkoxymethyl)methacrylamide monomer, and at least one other vinyl monomer, the reaction being carried out in the presence of a solvent including a polyol, wherein the polyol molecule includes OH groups of different reactivity.

The percent by weight values above and throughout this description, unless specifically noted otherwise, are based on resin solids content relative to total resin solids content.

In the practice of this invention the coating compositions additionally may contain curing agents such as aminoplasts, phenolic resins, and/or urea-formaldehyde resins. The coatings obtained therefrom are continuous films which have excellent film properties.

DETAILED DESCRIPTION OF THE INVENTION

Vinyl Addition Resins

The preferred vinyl addition resins can be formed by polymerizing from about 5 to about 25 weight percent of an alpha, beta ethylenically unsaturated carboxylic acid with from about 75 to about 95 weight percent of at least one other copolymerizable vinyl monomer or monomers. The resulting copolymers have an acid value of from about 20 to about 350, preferably from about 45 to about 150. Preferred vinyl addition resins are formed from about 7 percent to about 15 percent of the alpha, beta-ethylenically unsaturated carboxylic acid and from about 85 percent to about 93 percent of the other copolymerizable vinyl monomer. Examples of suitable alpha, beta-ethylenically unsaturated carboxylic acids are those containing from 3 to 8 carbon atoms such as acrylic acid and methacrylic acid, both of which are preferred. Acids such as itaconic acid, maleic acid, fumaric acid, mono-esters of unsaturated dicarboxylic acids, e.g., methyl hydrogen maleate and ethyl hydrogen fumarate as well as anhydrides where they exist, may also be used.

The other copolymerizable vinyl monomer or monomers for the vinyl addition resin copolymerization may be selected from a wide variety of materials depending upon the properties desired. For example, at least a portion of the other copolymerizable monomer may be a vinyl aromatic compound such as styrene, alpha-methyl styrene, tertiary butyl styrene, vinyl toluene and vinyl xylene. Such monomers are preferred because of their good water and pasteurization resistance. Additional monomers which may be used are the alkyl esters of methacrylic acid which contain from 1 to 3 carbon atoms in the alkyl group. Specific examples of such esters are methyl methacrylate and ethyl methacrylate. Monomers which may be used and which provide flexibility to the coatings are the alkyl esters of acrylic acid having from 2 to 17 carbon atoms in the alkyl group and alkyl esters of methacrylic acid having from 4 to 17 carbon atoms in the alkyl group. Examples of monomers of this type are ethyl acrylate, propyl acrylate, butyl acrylate, hexyl acrylate, 2-ethyl-hexyl acrylate, butyl methacrylate, 2-ethyl-hexyl methacrylate, lauryl methacrylate, and stearyl methacrylate. Still other monomers include vinyl monomers such as ethylene, propylene and the like, the vinyl halides, vinylidene halides, vinyl versatate, vinyl acetate, dialkyl maleate, allyl chloride, allyl alcohol, 1,3-butadiene, 2-chlorobutene, methyl vinyl ether, acrylamide, methacrylamide, acrylonitrile, and methacrylonitrile. Mixtures of any of the above-described vinyl monomers may be used and are preferred. Mixtures of vinyl addition resins formed separately can also be used.

A third monomer included in the vinyl addition copolymer resin is an N-(alkoxymethyl)acrylamide or N-(alkoxymethyl)methacrylamide having 1 to 4 carbon atoms in the alkoxy group. The preferred member of this group is N-(butoxymethyl)acrylamide. Examples of other members include N-(butoxymethyl)methacrylamide and N-(ethoxymethyl)acrylamide. These acrylamide monomers may be included in amounts typically ranging from 10 to 50 weight percent of the monomer mixture.

Vinyl addition resins described above can be prepared by free radical initiated polymerization of a mixture of the copolymerizable acrylic monomers by solution polymerization techniques. Usually, the monomers are dissolved in a solvent or a mixture of solvents and polymerized until the free monomeric content is reduced to below about 0.5 percent, preferably below about 0.1 percent. Examples of free radical initiators include azobis(alpha-gamma)-dimethylvaleronitrile, tertiary-butyl perbenzoate, tertiary-butyl peracetate and benzoyl peroxide. Usually, the solvent is first heated to reflux and a mixture of the monomers and the free radical initiator are added simultaneously and slowly to the refluxing solvent. Additional catalyst is optionally added and the reaction mixture held at polymerizing temperatures so as to reduce the free monomer content of the reaction mixture.

The solvent used in the vinyl addition copolymerization in accordance with the present invention includes at least one polyol characterized by OH groups having differing reactivity with regard to the acrylamide groups, i.e., having a molecular structure with combinations of a primary OH group, a secondary OH group, or a tertiary OH group, but avoiding two or more primary OH groups, two or more secondary OH groups, or two or more tertiary groups on a single molecule. Preferably, the polyol includes one primary OH group and one secondary OH group, examples of which include propylene glycol(1,2-propanediol), 1,3-butanediol, 1,2-octanediol, 2-methyl-2,4-pentanediol, and 2,2,4-trimethyl-1,3-pentanediol. An example of a suitable polyol having a combination of a primary, secondary, and tertiary alcohol is 3-methyl-1,2,3-hexanetriol. The use of analogous higher homologs of these polyols is also contemplated. Preferably, the entire alcohol content of the solvent consists of one or more of the polyols characterized above, but some mono-alcohol may be included without detracting significantly from the advantages of the present invention. Other non-alcohol solvents may be mixed with the polyol. Examples of non-alcoholic solvents that may be used with the polyols include ketones such as acetone, methyl ethyl ketone, and methyl isobutyl ketone. Moderate levels of water-insoluble solvents such as toluene or xylene may also be used. The polyols having OH groups of different reactivity as described above comprise at least 5 percent by weight of the total solvent used during the vinyl addition copolymerization, preferably at least 20 percent, most preferably at least 50 percent.

It has been observed that when the vinyl addition copolymerization is carried out in a polyol such as propylene glycol, approximately 50 mole percent of the N-(alkoxymethyl)acrylamide groups are reacted with the polyol solvent. Mono-alcohols react to a much lower extent (e.g., about 12 mole percent in the case of butyl Carbitol®). These reactions have been confirmed by loss of polyol as determined by gas chromatography, and by shift of the methylene peak of propylene glycol in C13 NMR. Reaction between N-(alkoxymethyl)acrylamide groups also is believed to take place, which accounts for a larger molecular weight increase than would otherwise be expected. The presence of this reaction product in the coatings containing the vinyl addition copolymers of the present invention is believed to be responsible for at least some of the improved application latitude observed. However, the use of polyols in general has been found to be unacceptable in many cases due to excessive molecular weight increases resulting in gelation, which renders the resins useless for their intended use. The presence of acid groups from acrylic acid, which is needed in these resins to provide water dispersion capability, also appears to be involved in the gelation problem. Although acid groups do not appear to participate in the reaction (since acid values do not change), it is believed that the acidic groups catalyze the reaction of OH groups with N-(alkoxymethyl)acrylamide. Copolymers without acrylic acid in the monomer charge can be made without the gelation problem. To provide the desirable reaction of OH groups with N-(alkoxymethyl)acrylamide without gelation it was found that polyols with two primary OH groups should be avoided. Although the copolymerizations which were carried out in polyols having two primary OH groups gelled the most rapidly, it was found that polyols in which the hydroxyl groups were both secondary also presented gelation problems. What was found to be required to successfully produce the desired reaction products without gelling was to use polyols having OH groups of unequal reactivity (e.g., one primary OH and one secondary OH). That it is N-(alkoxymethyl)acrylamide that is involved in the gelation was confirmed by the fact that when it was replaced with butyl methacrylate, copolymers were produced with relatively low molecular weight increase, regardless of the type of polyol used as solvent.

Epoxy Resins

The amine-defunctionalized epoxy component of the coating formulation of the present invention may be prepared by reacting a polyepoxide resin with ammonia or an amine having at least two active hydrogen atoms. The polyepoxide resin useful herein is a compound or a mixture of compounds having more than 1.0 epoxy groups per molecule.

A preferred class of polyepoxides are the polyglycidyl ethers of polyphenols, such as bisphenol A. These are produced by etherification of a polyphenol with epichlorohydrin in the presence of an alkali. The phenolic compound can be 2,2-bis(4-hydroxyphenyl)propane; 1,1-bis(4-hydroxyphenyl)ethane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another quite useful class of polyepoxides are produced similarly from polyphenol resins.

Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl)propane.

Cycloaliphatic polyepoxide resins can also be used. Such resins are prepared by epoxidation of cyclic olefins with organic peracids, e.g. peracetic acid.

In addition to the polyepoxide resins described above, addition polymerization polymers containing pendent epoxy groups may be utilized in this invention. Such polymers are made by copolymerizing a wide variety of polymerizable vinyl monomers including monomers such as glycidyl acrylate and glycidyl methacrylate. Suitable vinyl monomers include those which do not contain a group reactive with the epoxy group and preferably include the alpha, beta-ethylenically unsaturated carboxylic acid esters of saturated alcohols containing from 1 to 8 carbon atoms and the monovinyl aromatic monomers of the benzene class, e.g., styrene and vinyl toluene.

As indicated above, the polyepoxide resin is reacted with ammonia or an amine having at least 2 active hydrogen atoms. The active hydrogen atoms can be on the same nitrogen atom, e.g., the primary amines or on different nitrogen atoms in a compound, e.g., di- or polyamines wherein the active hydrogen atoms can be on the same nitrogen atom, or on two or more nitrogen atoms. Examples of primary amines include ethylamine, propylamine, isopropylamine and butylamine. Examples of polyamines include hydrazine, ethylene diamine, propylene diamine, butylene diamine, hexylene diamine, diethylene triamine, tetraethylene pentamine, N-methylethylene diamine, N-methylbutylene diamine, N,N-dimethylethylene diamine, N,N-dipropylethylene diamine, and N,N-dimethylhexylene diamine. Preferably, ammonia or monoethanolamine are used either separately or in any combination, most preferably ammonia. Typically the ammonia is used in solution as ammonium hydroxide.

The reaction of the polyepoxide resin with the ammonia or amine involves a ring opening reaction where the resultant ungelled product is the amine-terminated product of a polyepoxide resin. It is desired that substantially all of the 1,2-epoxy groups contained in the polyepoxide resin be reacted with the ammonia or amine. For this reason, a molar excess of the ammonia or amine to epoxy groups in the epoxy defunctionalization reaction is typically used. The excess may be expressed as a ratio of epoxy groups to primary amine groups of 1:1.5 to 1:6. Larger excesses may be employed, but are not preferred due to excessive release of ammonia or amine. If it is desired to minimize the amount of excess volatile ammonia or amine that needs to be captured in the manufacturing facility, it has been found possible to use a ratio of epoxy to primary amine groups at or near 1:1, which is the subject matter of co-pending, commonly owned U.S. patent application Ser. No. 219,603, filed on even date herewith by Shanti Swarup and Ronald R. Ambrose now U.S. Pat. No. 5,428,084. The reaction of the polyepoxide resin with the ammonia or amine occurs over a wide range of temperatures, preferably from about 30° C. to about 100° C. The time of reaction varies according to the temperature used in the reaction.

A solvent or mixture of solvents is preferably included in the reaction of the epoxy resin and ammonia or amine for the purpose of achieving better reaction control. Any nonreactive solvent can be used, examples of which include the ketones and alcohols. The product can be diluted to suitable viscosity with addition solvent, examples of which include: methyl ethyl ketone, methyl butyl ketone, xylene, ethanol, propanol, isopropanol, butanol, butyl ether of ethylene glycol, and propylene glycol.

Coating Compositions

The coating compositions of the preferred embodiments comprise resinous blends having from about 5 percent to about 95 percent, preferably from about 20 percent to about 75 percent of the vinyl addition resin and from about 5 percent to about 95 percent, preferably from about 20 percent to about 75 percent of the modified epoxy resin. The solids content of the compositions range from about 20 percent to about 60 percent with the balance of the composition comprising water, organic solvent, or a mixture of water and organic solvent. Compositions wherein water is the major liquid carrier are preferred.

The resinous blends are prepared from the aforedescribed vinyl addition resins and modified epoxy resins in alternative ways. In one alternative, the vinyl addition resins and modified epoxy resins are separately made. In adapting the resinous blend to water-based compositions useful herein, the acid group containing vinyl addition copolymer is at least partially neutralized with a base either before or after blending with the modified epoxy resin, and subsequently water is added to form the coating composition. The bases useful herein can be organic or inorganic. Illustrative examples of the bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, diisopropanolamine, dimethylethanolamine and diethylethanolamine; morpholine; and inorganic hydroxides such as potassium and sodium hydroxide. Usually, the pH of the final aqueous dispersion is adjusted to 7 to 10, preferably less than 9. The percent of neutralization is such as would make the resinous blends water-dispersible. The resinous blend may be partially neutralized from 20 percent up to 95 percent based on acid groups in the vinyl addition copolymer. Additional improvements to coating application latitude have been found from partially neutralizing the carboxyl group content of the resin blend, e.g., less than 65 percent, preferably less than 50 percent, and this feature is the subject matter of commonly owned, copending U.S. patent application Ser. No. 219,601 filed on even date herewith by Shanti Swarup, Ronald R. Ambrose, and Lawrence J. Fitzgerald.

An alternative way to prepare the resinous blends comprises blending the vinyl addition resin with the polyepoxide resin and then reacting the epoxide groups with ammonia or amine.

It is often desirable in order to get a more durable film to add an external crosslinking agent to the above-described coating compositions. Examples thereof include the aminoplast resins, phenoplast resins, and isocyanates, preferably blocked polyisocyanates. The level of crosslinking agent used as part of the film-forming resin range up to about 40 percent, and is preferably from about 5 percent to about 20 percent of the film-forming resin. While vinyl addition resins derived from N-(alkoxymethyl)methacrylamide and N-(alkoxymethyl)acrylamide are capable of crosslinking without an external crosslinking agent, such as agents may be added.

Aminoplast resins are the condensation products of an aldehyde, e.g., formaldehyde, acetaldehyde, crotonaldehyde, and benzaldehyde, with an amino- or amido group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. Etherified melamine-formaldehyde resin is the preferred aminoplast resin.

Phenolic resins include the condensation product of an aldehyde with a phenol. Formaldehyde and acetaldehyde are preferred aldehydes. Various phenols can be used, e.g., phenol, cresol, p-phenylphenol, p-tert-butylphenol, p-tert-amylphenol and cyclopentylphenol.

A number of blocked polyisocyanates are satisfactory crosslinking agents. These agents are well known in the art. Generally, the organic polyisocyanates are blocked with a volatile alcohol, epsilon-caprolactam or ketoxime. These blocked polyisocyanates become unblocked at elevated temperatures, e.g., above about 100° C.

The coating compositions of this invention may contain other optional components such as pigments, fillers, antioxidants, flow control agents, surfactants and the like.

The coatings of the present invention have been found to possess particular advantages when utilized on high speed roll coating lines for coating sheet aluminum stock intended for containers, but the coatings could be applied onto any substrate, particularly metallic substrates, by any conventional process. The coatings may also be adapted for electrodeposition. Typically, the coatings are cured at elevated temperatures on the order of 200° C. to 300° C.

THE EXAMPLES

Set forth hereinafter are comparisons of embodiments of the invention and embodiments outside the scope of the invention. Examples A1 through A14 disclose vinyl addition copolymerization procedures using a variety of alcohol solvents, and the results reported in Table 1 demonstrate the effect of these solvent choices on molecular weight. In Examples A1 through A10 and A12 through 14, copolymerization of the same monomer mixture of 27.5% N-(butoxymethyl)acrylamide (NBMA), 10% butyl acrylate, 50% styrene, and 12.5% acrylic acid was carried out in various dihydroxy functional alcohols. In Example A11, N-(butoxymethyl)acrylamide was replaced with butyl methacrylate for comparison. All the reaction conditions were kept constant including temperature which was adjusted by adding methyl ethyl ketone. In Example E1, a modified epoxy resin is disclosed which may be blended with the vinyl addition copolymers. Examples D1 through D5 disclose making dispersions of several of the vinyl addition copolymers of Examples A1-A14 blended with the modified epoxy resin of Example E1. These dispersions were then incorporated into coating formulations as set forth in Examples F1 through F5. These coating formulations were tested for coating application latitude, and the results are set forth in Table 2.

Example A1

An acid group containing vinyl addition resin was prepared as follows:

| Ingredients | Parts by Weight |
|---|---|
| Flask Charge | |
| Methyl ethyl ketone | 160.5 |
| Propylene glycol | 1702.0 |
| Shellmax ® wax* | 175.0 |
| Monomer Charge | |
| N-(butoxymethyl)acrylamide** | 2133.5 |
| Butyl acrylate | 437.5 |
| Acrylic acid | 503.0 |
| Styrene | 2122.5 |
| Initiator Charge | |
| Benzoyl peroxide*** | 109.0 |
| Methyl ethyl ketone | 537.5 |
| Initiator (Scavenger) Charge | |
| Benzoyl peroxide*** | 39.0 |
| Methyl ethyl ketone | 300.0 |
| Thinning Solvent | |
| Methyl ethyl ketone | 1546.5 |

*Shellmax wax is a highly refined petroleum wax of long chain saturated hydrocarbon molecules available from Shell Chemical Company. It is 100 percent solids.
**N-(butoxymethyl)acrylamide is 55.4% solids in 8% xylene and 36.6% n-butanol.
***Benzoyl peroxide is 78% solids in water.

The flask charge was taken into a 5 liter round bottom flask equipped with stirrer, dropping funnel, thermometer, condenser and a nitrogen inlet. The mixture was heated to reflux at 140° C. The monomer and initiator charges were fed simultaneously to the reaction mixture over a period of 4 hours. Upon completion of these additions, the initiator (scavenger) charge was added in three equal portions. After each addition, the reaction mixture was held for 1.5 hours. The resulting product was cooled below 60° C., followed by the addition of thinning solvent. The product was stored at room temperature. Analysis of the product was as follows: theoretical solids 46%, viscosity 3275 centipoise (Brookfield viscometer with number 4 spindle at 20 rpm), propylene glycol content 14.56% as measured by gas chromatography (theoretically 17.36%), acid equivalent 1403.0 as measured by base titration (theoretically 1410), weight average molecular weight 70,000

Example A2

Same as example A1, but the propylene glycol of the flask charge was replaced with butyl Carbitol® (butyl ether of diethylene glycol). Analysis: theoretical solids 46%, viscosity 5360 centipoise, butyl Carbitol® content 15.86% by gas chromatography (theoretically 17.18%), weight average molecular weight of about 130,000.

Example A3

Same as example A1, except that the propylene glycol in the flask charge was replaced by Propasol® B (butyl ether of propylene glycol). Analysis: theoretical solids 46%, viscosity 2890 centipoise, Propasol® B content 16.62% (theoretically 17.36%), weight average molecular weight about 112,000.

Example A4

Same as example A1, except that propylene glycol was replaced with Propasol® P (propyl ether of propylene glycol). Analysis: theoretical solids 46%, viscosity 1920 centipoise, Propasol® P content 17.05% (theoretically 17.36%), weight average molecular weight about 93,000.

Example A5

Same as example A1, except that propylene glycol was replaced with ethylene glycol. Analysis: The product was extremely high in viscosity after the end of monomer feed and gelled during the addition of first ⅓ initiator (scavenger) feed.

Example A6

Same as example A5, except that ethylene glycol was replaced with diethylene glycol. Analysis: The reaction product was gelled during the addition of monomer and initiator feeds.

Example A7

Same as example A1, except that propylene glycol was replaced with DPG (dipropylene glycol). Analysis: The reaction product was extremely viscous after the addition of ⅔ of the initiator scavenger feed, and gelled during the hold period.

Example A8

Same as example A1, except that propylene glycol was replaced with polypropylene glycol (molecular weight 425; a reaction product of 1 mole of propylene glycol and 6 moles of propylene oxide). Analysis: The reaction product was gelled upon the completion of monomer and initiator feeds.

Example A9

Same as example A1, except that propylene glycol was replaced with Dowanol® DPM Acetate (methyl ether of propylene glycol acetate). Analysis: The reaction product was gelled upon completion of monomer and initiator feeds.

Example A10

Same as example A1, except that propylene glycol was replaced with xylene. Analysis: theoretical solids 46%, xylene content 20.17% (theoretically 20.18%), and weight average molecular weight of 66,800.

Example A11

Same as example A2, except that N-(butoxymethyl) acrylamide was replaced with butyl methacrylate in the monomer feed. Analysis: theoretical solids 45% weight average molecular weight about 10,000.

Example A12

Same as example A1, except that propylene glycol was replaced with 1,3-butanediol. Analysis: theoretical solids 46%, viscosity 4,460 centipoises, 1,3-butanediol content 13.65% (theoretically 17.41), and weight average molecular weight about 33,660.

Example A13

Same as example A1, except that propylene glycol was replaced with 1,3-propanediol. The product gelled.

Example A14

Same as example A1, except that propylene glycol was replaced with 1,2-octanediol. Analysis: theoretical solids 35.45%, viscosity 380 centipoises, 1,2-octanediol content 12.19% (theoretically 16.5%), and weight average molecular weight about 60,744.

TABLE 1

Solvent - Molecular Weight Relationship

| Solvent | | Example | |
|---|---|---|---|
| Structure | Name | No. | MW |
| Di-Primary Diols | | | |
| $HOCH_2CH_2OH$ | Ethylene glycol | A5 | gel |
| $HO(CH_2)_2O(CH_2)_2OH$ | Diethylene glycol | A6 | gel |
| $HO(CH_2)_3OH$ | 1,3-propanediol | A13 | gel |
| Primary Plus Secondary Diols | | | |
| $H_3CCH(OH)CH_2OH$ | Propylene glycol | A1 | 70,000 |
| $H_3CCH(OH)CH_2CH_2OH$ | 1,3-butanediol | A12 | 33,660 |
| $H_3C(CH_2)_5CH(OH)CH_2OH$ | 1,2-octanediol | A14 | 60,744 |
| Di-Secondary Diols | | | |
| $[H_3CCH(OH)CH_2]_2O$ | Dipropylene glycol | A7 | gel |
| $H[OCH(CH_3)CH_2]_nOH$ | Polypropylene glycol | A8 | gel |
| Primary or Secondary Mono-Alcohols | | | |
| $H_3CCH(OH)CH_2O(CH_2)_2CH_3$ | Propasol ® P | A4 | 93,000 |
| $H_3CCH(OH)CH_2O(CH_2)_3CH_3$ | Propasol ® B | A3 | 112,000 |
| $C_4H_9(OC_2H_4)OH$ | Butyl Carbitol ® | A2 | 130,000 |
| Non-Alcohol Solvents | | | |
| $H_3COCH_2CH(CO_2CH_3)CH_3$ | Dowanol ® DPM Acetate | A9 | gel |
| $(H_3C)_2C_6H_4$ | Xylene | A10 | 66,800 |

The results in Table 1 show that the copolymerization reactions that were conducted in diols in which both OH groups were of the same reactivity, i.e., either all primary or all secondary (e.g., ethylene glycol, diethylene glycol, 1,3 propanediol, dipropylene glycol, and polypropylene glycol) resulted in a gel. On the other hand, when the reactions were conducted in diols where one hydroxyl group was primary and the other was secondary (propylene glycol, 1,3 butanediol, 1,2 octanediol), the resulting polymers did not gel, but had measurable molecular weights, e.g., less than 150,000. Those copolymers which were prepared in mono-alcohols exhibited no tendency to form gels, irrespective of whether the OH group was primary or secondary. However, those copolymers prepared in mono-alcohols did not exhibit the improvement in coating application latitude found for the embodiments of the present invention.

Example E1

| Ingredient | Parts by weight |
|---|---|
| Charge 1 | |
| EPON ® 828 epoxy resin* | 1704.1 |
| Xylene | 23.8 |
| Bisphenol A | 820.0 |

-continued

| Ingredient | Parts by weight |
|---|---|
| *Charge 2* | |
| Ethylenetriphenylphosphonium iodide | 1.7 |
| Xylene | 92.8 |
| *Charge 3* | |
| Butyl Carbitol®** | 325.6 |
| Methyl ethyl ketone | 703.0 |
| Butanol | 326.2 |

*EPON® 828 is a epoxy functional resin (epoxy equivalent weight 188) available from Shell Chemical Company.
**Butyl Carbitol® is butyl ether of diethylene glycol available from Union Carbide.

The charge 1 was taken into a 5 liter flask and heated to 105°–110° C. The contents of the flask were held at this temperature for 30 minutes or until dissolved. When dissolved, charge 2 was added, and the mixture was heated to 135° C. The reaction mixture was then allowed to exotherm to 160°–190° C. and then held for 1.5 hour at 160° C. Following the hold period, the product was allowed to cool to 90° C. Charge 3 was added and the product was cooled and stored at room temperature. The polymerized epoxy resin had epoxy equivalent weight of about 1450, and theoretical solids of 65%.

Example D1

The defunctionalization of the epoxy groups of the modified epoxy resin with ammonia, mixing with a vinyl addition (acrylic) copolymer, and dispersing the mixture in water was done as follows:

| Charge No. | Ingredient | Parts by weight |
|---|---|---|
| 1 | Modified epoxy of Example E1) | 1750.1 |
| 2 | Ammonium hydroxide (28% aqueous) | 205.4 |
| 3 | Acrylic polymer (Example A1) | 1112.3 |
| 4 | Dimethylethanol amine (DMEA) | 30.4 |
| 5 | Deionized water | 474.3 |
| 6 | Deionized water | 837.1 |

Charge 1 was taken into a 5 liter round bottom flask, and heated to 35°–37° C. Charge 2 was then added sub-surface over 15 minutes. The contents of the flask were heated to 55° C. over 30 minutes and held at this temperature for 2 hours. The excess ammonia and some solvents from the modified epoxy were distilled while keeping the temperature below 90° C. Charge 3 was then added to the flask, and the contents were mixed for 30 minutes. Some solvents of the acrylic polymer were distilled by heating the contents to 110° C. Charge 4 was then added, and the contents were held for 15 minutes. Charges 4 and 5 were added over 90 and 120 minutes, respectively. The product was cooled and stored at room temperature. Analysis: The reaction product had a solids content of 42%, viscosity of 1240 centipoises (Brookfield viscometer with number 4 spindle at 20 rpm), pH of 8.51, particle size of about 5800 Å, and 43.5% of the acidic groups were neutralized with dimethylethanolamine.

Example D2

Same as example D3, except that the acrylic polymer of Example A1 was replaced with the acrylic polymer of Example A2 (butyl Carbitol® solvent). Analysis: the resulting polymeric dispersion had a particle size of 11,900 Å and solids content of 42%.

Example D3

Same as example D3, except that the acrylic polymer A1 was replaced with acrylic polymer A3 (Propasol® B solvent). The resulting polymeric dispersion had particle size of 4010 Å, pH of 8.7, viscosity of 596 centipoises, and solids content of 42%.

Example D4

Same as Example D3, except that the acrylic polymer A1 was replaced with acrylic polymer A4 (Propasol® P solvent). The resulting polymeric dispersion had particle size of 4270 Å, pH of 8.55, viscosity of 790 centipoises, and solid contents of 42%.

Example D5

Same as Example D3, except that the acrylic polymer A1 was replaced with acrylic polymer A12 (with 1,3-butanediol used as the solvent). The resulting polymeric dispersion had a particle size of 4,170 Å, pH of 8.25, viscosity of 1,640 centipoises, and solids content of 42%.

COATING FORMULATIONS

The polymeric dispersions described in Examples D1 through D5 were combined with additional film formers, such as phenolic resins and/or urea-formaldehyde resins, and water to produce coating formulations F1 through F5. The amount of the additional film formers used is not critical, but typically each may be present in amounts of 0–3% by weight on a resin solids basis. In each of the following examples F1 through F5, the urea-formaldehyde resin is "Beetle 80," an etherified, butylated urea-formaldehyde from American Cyanamid, and the phenolic resin is "Uravar FB209," a 57% solids solution in butanol and toluene from DSM Resins. These formulations were subsequently reduced to application viscosity, typically 15–25 seconds in a #4 Ford cup, with additional water prior to evaluation for application characteristics.

| Ingredients | Parts by Weight |
|---|---|
| EXAMPLE F1 | |
| Epoxy-acrylic dispersion (Example D1) | 2,512 |
| Urea-formaldehyde resin | 40 |
| Phenolic resin solution | 66 |
| Deionized water | 359 |
| EXAMPLE F2 | |
| Epoxy-acrylic dispersion (Example D2) | 3118 |
| Urea-formaldehyde resin | 53 |
| Phenolic resin solution | 87 |
| Deionized water | 259 |
| EXAMPLE F3 | |
| Epoxy-acrylic dispersion (Example D3) | 2,501 |
| Urea-formaldehyde resin | 39 |
| Phenolic resin solution | 64 |
| Deionized water | 360 |
| EXAMPLE F4 | |
| Epoxy-acrylic dispersion (Example D4) | 2,501 |
| Urea-formaldehyde resin | 38 |
| Phenolic resin solution | 62 |
| Deionized water | 279 |
| EXAMPLE F5 | |
| Epoxy-acrylic dispersion (Example D5) | 2556 |
| Urea-formaldehyde resin | 38 |
| Phenolic resin solution | 62 |
| Deionized water | 546 |

The application characteristics for each formulation F1 through F5 were evaluated using a Gasway Corporation lab coater (Model RPP044) and a Grieve Corporation high velocity oven (Model VA-1000). The lab coater was set-up with a stainless steel pick-up roll and a urethane rubber covered applicator roll, both 8 inches in diameter. These rolls were operated in a typical two roll reverse mode. The line speed of the lab coater was typically 500–550 feet per minute (fpm). The application roll speed was typically 500–560 feet per minute (150–170 meters per minute), and the pick-up roll speed was typically 100–200 feet per minute (30–60 meters per minute). The oven temperature was typically 500°–550° F. (260°–288° C.), with dwell time of 10–15 seconds.

Each formulation was filtered into a reservoir, the pick-up roll was partially submerged in the reservoir, and the motor driving the applicator and pick-up rolls was started. A 0.019 gauge (0.48 millimeter thick) aluminum panel (5182H19 alloy with A272A pretreatment from Aluminum Company of America) was attached to a stainless steel-belt which acted as the line. The line was started at the above-stated speed, and the coating was applied to the aluminum panel. The coated aluminum panel was then quickly transferred into the high velocity oven and cured. After cooling, the film weight per 4 square inches (25.8 square centimeters) was then determined and the film was examined for any sign of defects such as solvent blistering or air entrapment. This procedure was repeated at increased film weights until film defects were observed using unaided vision. The maximum film thickness without defects was then recorded as reported in Table 2. Film thickness is reported as dry coating weight per four square inches (25.8 square centimeters) of substrate.

TABLE 2

| Formulation | Dispersion | Copolymer | Percent Neutralized | Blister-free Thickness | Particle Size (Å) |
|---|---|---|---|---|---|
| F1 | D1 | A1 | 43.5 | 40–43 | 5800 |
| F2 | D2 | A2 | 43.5 | 33 | 11,900 |
| F3 | D3 | A3 | 43.5 | 25 | 4,010 |
| F4 | D4 | A4 | 43.5 | 26 | 4270 |
| F5 | D5 | A12 | 43.5 | 40 | 3820 |

The invention has been disclosed herein with reference to particular embodiments for the sake of disclosing the best mode of carrying out the invention, but it should be understood that other variations and modifications as are known to those of skill the art may be resorted to without departing from the scope of the invention as defined by the claims which follow.

We claim:

1. The process for preparing an ungelled, water dispersible resin comprising: reacting together vinyl monomers including an acid group containing monomer, and N-(alkoxymethyl)acrylamide or N-(alkoxymethyl) methacrylamide monomer, and at least one other vinyl monomer in the presence of a solvent comprising a polyol having OH groups of unequal reactivity, wherein said polyol is selected from the group consisting of:
   (a) a polyol which includes a combination of a primary OH group and a tertiary OH group,
   (b) a polyol which includes a combination of a secondary OH group and a tertiary OH group, and
   (c) a polyol which includes a combination of a primary OH group, a secondary OH group and a tertiary OH group.

2. The process of claim 1 wherein the vinyl monomers include N-(butoxymethyl)acrylamide.

3. The process of claim 1 wherein the other vinyl monomer includes an aromatic vinyl monomer.

4. The process of claim 2 wherein the other vinyl monomer additionally includes an alkyl acrylate monomer.

5. The process of claim 3 wherein the aromatic vinyl monomer is styrene.

6. The process of claim 4 wherein the alkyl acrylate monomer is butyl acrylate.

7. The process of claim 1 wherein the acid group containing vinyl monomer is selected from the group consisting of acrylic acid, methacrylic acid, and mixtures thereof.

8. The process of claim 7 wherein the acid group containing monomer comprises 5 to 25 percent by weight on a resin solids basis of the total monomers reacted.

9. The process of claim 1 wherein the polyol comprises at least 5 percent by weight of the solvent present during the copolymerization.

10. The process of claim 1 wherein the polyol comprises at least 20 percent by weight of the solvent present during the copolymerization.

11. The process of claim 1 wherein the polyol comprises at least 50 percent by weight of the solvent present during the copolymerization.

12. The process for preparing an ungelled, water dispersible resin comprising: reacting together vinyl monomers including an acid group containing monomer, and N-(alkoxymethyl)acrylamide or N-(alkoxymethyl) methacrylamide monomer, and at least one other vinyl monomer in the presence of a solvent comprising a polyol having OH groups of unequal reactivity, wherein the OH groups of a polyol include a combination of a primary OH group and a tertiary group.

13. The process for preparing an ungelled, water dispersible resin comprising: reacting together vinyl monomers including an acid group containing monomer, and N-(alkoxymethyl)acrylamide or N-(alkoxymethyl) methacrylamide monomer, and at least one other vinyl monomer in the presence of a solvent comprising a polyol having OH groups of unequal reactivity, wherein the polyol is selected from the group consisting of 1,2-octanediol, 2-methyl-2,4-pentanediol, and 2,2,4-trimethyl-1,3-pentanediol.

14. The process of claim 13 wherein the polyol is selected from the group consisting of 1,2-octanediol, and 2,2,4-trimethyl-1,3-pentanediol.

15. The process for preparing an ungelled, water dispersible resin comprising: reacting together vinyl monomers including an acid group containing monomer, and N-(alkoxymethyl)acrylamide or N-(alkoxymethyl) methacrylamide monomer, and at least one other vinyl monomer in the presence of a solvent comprising a polyol having OH groups of unequal reactivity, wherein the OH groups of a polyol include a combination of a primary OH group, a secondary OH group and a tertiary OH group.

16. The process of claim 15 wherein the polyol comprises 3-methyl-1,2,3-hexanetriol.

* * * * *